United States Patent [19]

Aono et al.

[11] 4,015,565
[45] Apr. 5, 1977

[54] SPARK-ADVANCE CONTROL APPARATUS FOR INTERNAL COMBUSTION ENGINE

[75] Inventors: Shigeo Aono, Tokyo; Kenji Ikeura, Yokohama; Yoshitaka Hata, Fujisawa, all of Japan

[73] Assignee: Nissan Motor Co., Ltd., Yokohama, Japan

[22] Filed: June 12, 1975

[21] Appl. No.: 586,214

[30] Foreign Application Priority Data

June 21, 1974 Japan ............................. 49-70288

[52] U.S. Cl. ...................... 123/117 D; 123/146.5 A
[51] Int. Cl.² .......................................... F02P 1/00
[58] Field of Search ... 123/32 EA, 117 R, 146.5 A, 123/148 E, 117 D

[56] References Cited

UNITED STATES PATENTS

| | | | |
|---|---|---|---|
| 3,756,212 | 9/1973 | Schirmer et al. | 123/148 E |
| 3,853,103 | 12/1974 | Wahl et al. | 123/148 E |
| 3,898,894 | 8/1975 | Aono et al. | 123/148 E |
| 3,904,856 | 9/1975 | Monpetit | 123/32 EA |
| 3,906,205 | 9/1975 | Yoshida et al. | 123/32 EA |
| 3,921,610 | 11/1975 | Hartig | 123/117 R |
| 3,927,648 | 12/1975 | Hawai et al. | 123/117 R |

*Primary Examiner*—C. J. Husar
*Assistant Examiner*—Paul Devinsky

[57] ABSTRACT

An apparatus for controlling spark advance in an internal combustion engine of an automotive vehicle, characterized by a circuit arrangement which is operative to detect the angular speed of rotation of the engine output shaft in a digital fashion and produce digital signals responsive to changes in preselected operating conditions such as engine output speed and intake manifold vacuum for controlling the spark advance in accordance with predetermined schedules. The spark advance is thus controlled without being affected by negligible or incidental transient fluctuations in the operating conditions of the engine and the advance characteristics can be readily altered by varying the schedules on which the digital signals are produced.

11 Claims, 5 Drawing Figures

SPARK-ADVANCE CONTROL APPARATUS FOR INTERNAL COMBUSTION ENGINE

The present invention relates to apparatus for controlling spark advance in an internal combustion engine of an automotive vehicle.

The spark-advance characteristics of an internal combustion engine seriously affect not only the total performance characteristics of the engine but also the emission of toxic compounds in the exhaust gases of the engine, as is well known in the art. A variety of sophisticated versions of spark-advance control devices have therefore been developed and installed on the internal combustion engines of automotive vehicles mainly for the purpose of reducing the toxic compounds contained in the exhaust gases of the engines. The prior art spark-advance control devices which are most widely used at present utilize a centrifugal spark-advance mechanism operating in response to the output speed of the engine and/or a vacuum-advance mechanism which operates in response to the vacuum developed in the intake manifold of the engine. The spark-advance control devices thus operating on the basis of mechanical actions are, however, unable to meet the exacting requirements of the modern internal combustion engines because of the inaccuracy of operation concomitant with the mechanical actions in general and the retarded response to the varying operating conditions of the engines and because of the limitations in varying the spark-advance characteristics depending upon the performance characteristics inherent in the individual engines and upon the conditions under which the engines are operated.

Transistorized spark-advance control devices have therefore been proposed with a view to eliminating these problems encountered in the mechanically operating spark-advance control devices. The transistorized spark-advance control devices are capable of precisely controlling the spark-advance characteristics in accordance with the intrinsic performance characteristics of the engine and the varying operating conditions of the engine. The devices of this type are, however, responsive to every minor and/or casual change of the operating conditions of the engine as caused between the different cylinders of the engine or between the successive cycles of operation of each of the engine cylinders so that the spark-advance characteristics of the engine are erroneously or ineffectually varied or "controlled". The present invention contemplates elimination of all these drawbacks inherent in the prior art mechanically operating or transistorized spark-advance control devices for internal combustion engines of automotive vehicles.

It is, accordingly, an important object of the present invention to provide an improved spark-advance control apparatus which is correctly and reasonably responsive to the varying operating conditions of an internal combustion engine and, if desired, of the vehicle and which can be readily modified to oppositely fit the intrinsic performance characteristics of the engine.

It is another important object of the present invention to provide an improved spark-advance control apparatus which is unlikely to respond to negligible and/or incidental fluctuations of the operating conditions, especially the output speed of an internal combustion engine between the individual cylinders of the engine and/or between the successive cycles of operation of each of the engine cylinders.

It is, yet, another important object of the present invention to provide an improved spark-advance control apparatus which will provide spark-advance characteristics optimum for enhancing the performance efficiency of an internal combustion engine and reducing the toxic compounds in the exhaust gases of the engine throughout the various operating conditions of the engine.

In accordance with the present invention, these and other objects will be accomplished basically in a spark-advance control apparatus comprising analog signal generating means responsive to output speed of the engine and vacuum in the engine intake manifold for producing an analog signal which varies with the detected engine output speed and the detected intake-manifold vacuum in accordance with predetermined schedules, digital signal generating means responsive to preselected parameters that will affect the performance characteristics of the engine for producing a train of impulses with a frequency related to the parameters, detecting means responsive to rotational motion of the output shaft of the engine for producing a train of first impulses each representative of a timing at which the piston in each of the engine cylinders reaches a predetermined position relative to the associated engine cylinder and a train of second impulses with a frequency related to the angular speed of rotation of the engine output shaft, a computing circuit responsive to each of the first impulses from the detecting means for passing therethrough the impulses from the digital signal generating means for a period of time which varies with the analog signal from the analog signal generating means in accordance with a predetermined schedule, a memory circuit for registering the impulses passed through the computing circuit during each of the time intervals between the first impulses from the detecting means, and a counter circuit responsive to each of the first impulses from said detecting means for producing a spark-advance control signal at a timing which is advanced in proportion to the number of impulses registered in the memory circuit and to the frequency of the second impulses from the crank-angle detecting means.

The detecting means may comprise a circular disc member rotatable with the engine output shaft, a first circular ring mounted on the circumferential end of the disc member and having embedded therein a plurality of permanent magnets are equiangularly spaced apart from each other about an axis of rotation of the disc member, the number of the permanent magnets being one half of the number of the engine cylinders associated with the output shaft, a second circular ring mounted on the circumferential end of the disc member and having a multiplicity of south and north pole sections which are disposed alternatively to each other along the entire circumference of the ring, first electromagnetic pick-up means associated with a first circular ring for producing an output current when each of the permanent magnets on the disc member is magnetically linked with the pick-up means as the disc member is driven for rotation by the engine output shaft, the output current providing the first impulse delivered from the detecting means, and second electromagnetic pick-up means associated with the second circular ring for producing an output current when each of the pole sections having like polarity is magnetically linked with the second electromagnetic pick-up means as the disc member is driven to rotate by the engine output shaft, the output current from the second electromagnetic pick-up means providing the second impulse delivered from the detecting means.

The spark-advance control apparatus according to the present invention is thus characterized in that the angular speed of rotation of an internal combustion engine output shaft is detected in a digital fashion and that the spark advance is controlled by means of a digital signal responsive to changes in the operating conditions of the engine. The spark-advance control characteristics provided in such a manner will be less affected by a minor or casual transient change in the operating conditions of the engine than in the prior art devices of the natures previously described and may be readily varied in accordance with the desired engine performance characteristics by varying the circuit arrangement of, particularly, the analog and digital signal generating means above-mentioned.

The features and advantages of the spark-advance control apparatus according to the present invention will be more clearly understood from the following description taken in conjunction with the accompanying drawings in which.

Figure 1:
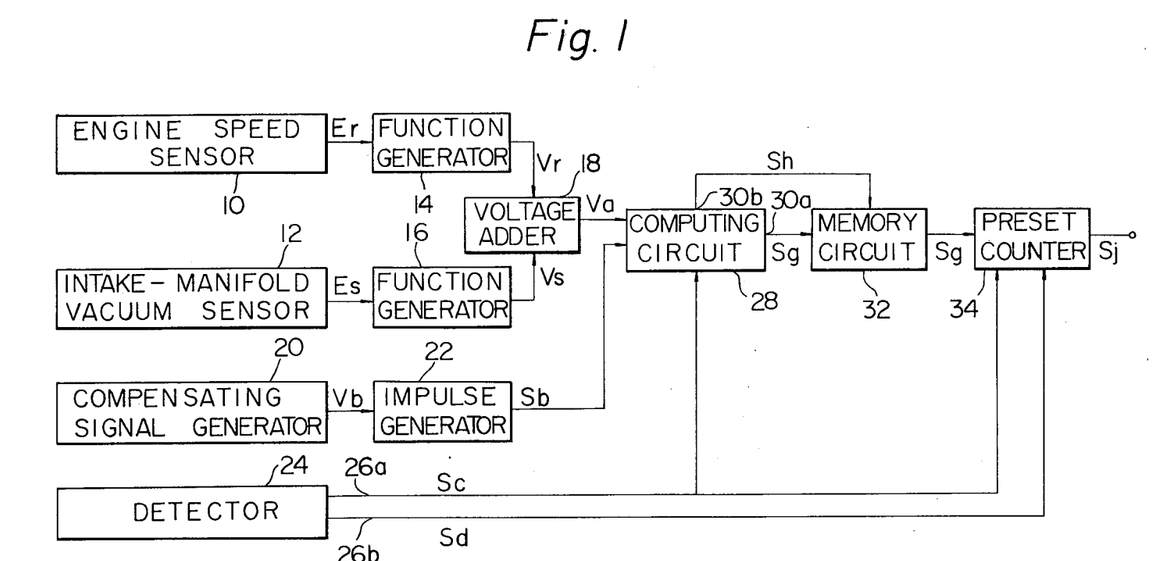
FIG. 1 is a block diagram showing a circuit arrangement of a preferred embodiment of the spark-advance control apparatus according to the present invention.
Figure 2:
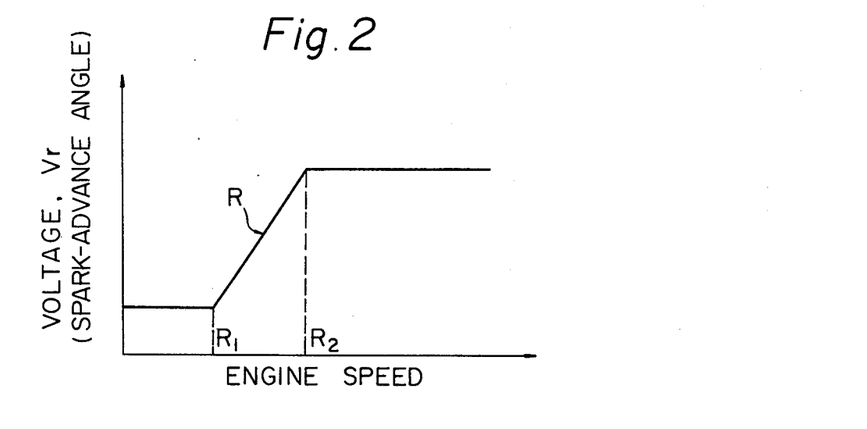
FIG. 2 is a graph showing an example of the waveform which is predominant over the schedule of operation of one circuit means incorporated into the arrangement illustrated in FIG. 1.
Figure 3:
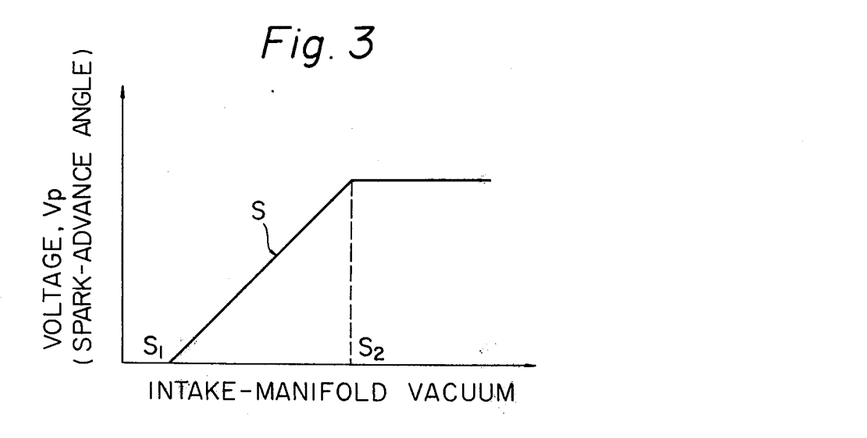
FIG. 3 is a view similar to FIG. 1 but shows a graph indicating an example of the waveform predominant over the schedule of operation of another circuit means incorporated into the arrangement illustrated in FIG. 1.

Reference will now be made to the drawings, first to FIG. 1 which diagrammatically shows a preferred embodiment of the circuit arrangement of the spark-advance control apparatus according to the present invention. The circuit arrangement comprises an engine speed sensor 10 as first sensing means and an intake-manifold vacuum sensor 12 as second sensing means. The first sensing means or engine speed sensor 10 is operative to detect the revolution speed of the output shaft of the engine (not shown) and to produce an analog signal such as a voltage E$r$ representative of or, preferably, proportional to the detected revolution speed of the engine output shaft, whereas the second sensing means or intake-manifold vacuum sensor 12 is operative to detect the vacuum developed in the intake manifold of the engine or, as an alternative, in the carburetor downstream of the throttle valve and to produce an analog signal such as a voltage E$s$ representative of or preferably proportional to the detected intake-manifold or carburetor vacuum. The signal voltages E$r$ and E$s$ thus produced by the engine speed sensor 10 and the intake-manifold vacuum sensor 12 are fed to first and second function generators 14 and 16, respectively. The first function generator 14 is responsive to the signal voltage E$r$ from the engine speed sensor 10 and produces a signal voltage V$r$ which varies with the input voltage E$r$, viz., with the output speed of the engine in accordance with a predetermined schedule, a preferred example of which is indicated by curve R in FIG. 2. As will be readily understood by those who are skilled in the art, the curve R shown in FIG. 2 is generally identical with the spark-advance characteristic curve achieved by a conventional centrifugal spark-advance mechanism which is arranged to produce a spark-advance based on engine speed. The first function generator 14 is, thus arranged to have the spark timed to appear in each of the engine cylinders just a few degrees of revolution of the engine output shaft before the piston reaches the top-dead-center (TDC) position in the cylinder on its compression stroke during idling conditions of the engine and to have the spark advanced substantially proportionately as the engine speed increases from a certain level $R_1$ until the amount of advance reaches a maximum at a certain engine speed which is indicated by $R_2$ in FIG. 2. On the other hand, the second function generator 16 is responsive to the signal voltage E$s$ from the intake-manifold vacuum sensor 12 and produces a signal voltage V$s$ which varies with the input voltage E$s$, viz., with the vacuum in the intake manifold of the engine in accordance with a predetermined schedule, a preferred example of which is indicated by curve S in FIG. 3. As will also be apparent to those skilled in the art, the curve S shown in FIG. 3 is generally identical with a spark-advance curve which can be obtained by a conventional spark-advance mechanism based on intake-manifold vacuum. The second function generator 16 is thus adapted to provide an additional spark advance when the engine is operating under part-throttle condition which is detected from the intake-manifold vacuum within the range of from $S_1$ to $S_2$ as indicated in FIG. 3. Although the "curves" R and S shown in FIGS. 2 and 3 are assumed to be composed of straight line segments, such are merely for the sake of simplicity of illustration of the general desired tendencies of the spark-advance characteristics and, thus, they may be "dog-legged" or continuously curved in actual designs.

Figure 4:
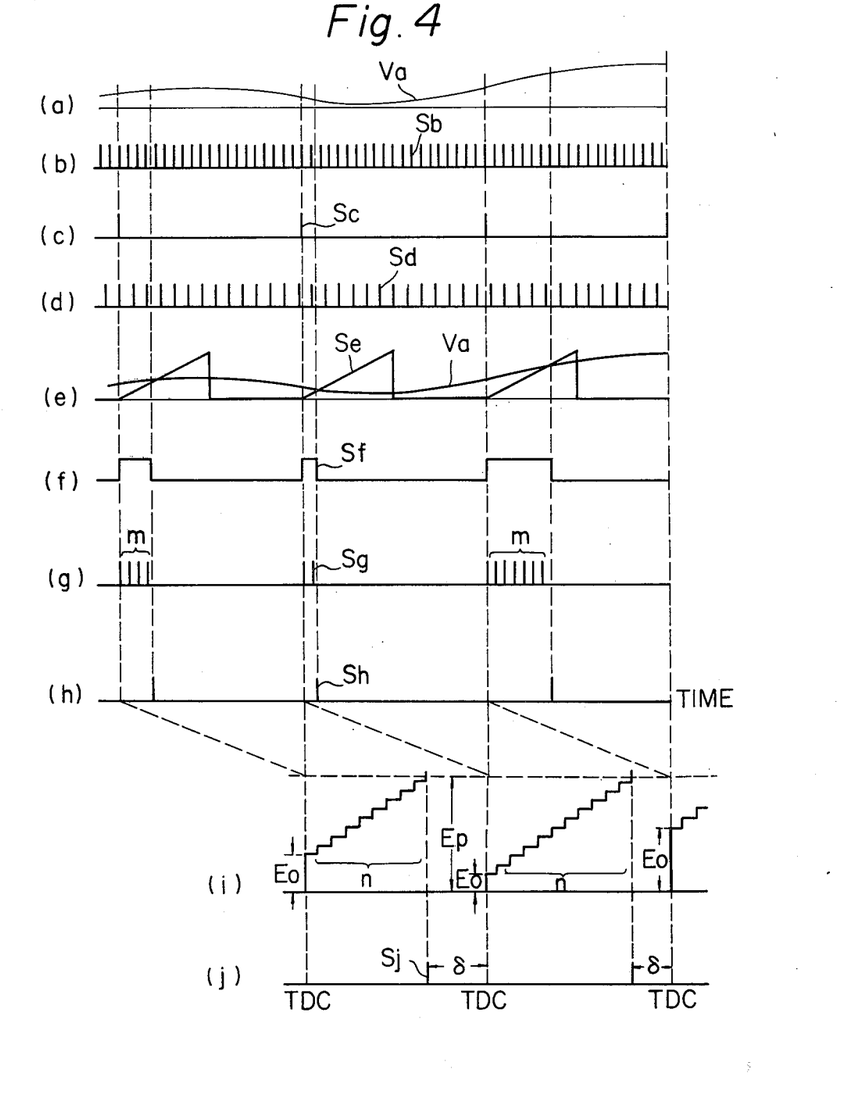
FIG. 4 is a view showing signals to be produced in the circuit arrangement illustrated in FIG. 1.

The signal voltages V$r$ and V$s$ produced by the first and second function generators 14 and 16 in these manners are fed to a voltage adding circuit 18, which produces an output voltage V$a$ equal to the arithmetic sum of the two input voltages V$r$ and V$s$. The signal voltage V$a$ delivered from the adding circuit 18 is compatible with both of the characteristics indicated by the curves R and S shown in FIGS. 2 and 3, respectively, and is therefore indicative, in an analog fashion, partly of the optimum spark-advance characteristics in terms of the output speed of the engine and partly of the spark-advance characteristic matched with the vacuum in the intake manifold of the engine and accordingly with the engine load and the throttle position. An example of the waveform of the voltage V$a$ produced by the adding circuit 18 is indicated in graph ($a$) of FIG. 4.

In addition to the engine speed and the vacuum in the intake manifold, there are various parameters which affect the engine performance achieved by advancing the ignition timings. These parameters include the temperature of the engine and the temperature and pressure of the ambient atmosphere, as previously mentioned. It is, thus, desirable to have ignition timings controlled not only on the basis of the engine speed and the intake-manifold vacuum but in terms of these additional parameters so as to achieve optimum spark-advance characteristics throughout the various operating and ambient conditions of the engine, or the vehicle as a whole. For this purposes, there is further provided in the circuit arrangement shown in FIG. 1 a compensating signal generator 20 which includes sensing elements (not shown) responsive to such operational and ambient conditions of the engine or the vehicle and which is operative to produce a signal voltage $Vb$ indicative, also in an analog fashion, of spark-advance characteristics optimum for the various parameters detected by the sensing elements. The signal voltage $Vb$ is supplied to an impulse generator 22 consisting of, for example, an oscillating circuit (not shown) for producing a digital output signal which is in the form of a train of impulses $Sb$ with a frequency proportional or otherwise related to the input voltage $Vb$ of the circuit 22. The train of impulses $Sb$ thus delivered from the impulse generator 22 is shown in graph (b) of FIG. 4.

The circuit arrangement illustrated in FIG. 1 further comprises a detecting unit 24 having first and second output terminals 26a and 26b. The crank-angle detecting unit 24 in responsive to the rotational motion of the output shaft of the engine and is operative to produce first and second digital signals at its first and second output terminals 26a and 26b, respectively. The first digital signal is in the form of a train of impulses $Sc$ representative of the timings at which the piston in each of the engine cylinders reaches a predetermined position relative to the cylinder such as, for example, the top-dead-center (TDC) position of the cylinder, as indicated in graph (c) of FIG. 4. The frequency of the impulses $Sc$ delivered from the crank-angle detecting circuit 24 is, thus, related to the number of cylinders incorporated in the engine or, if the engine is provided with two or more output shafts, to the number of cylinders associated with one of the output shafts. On the other hand, the digital signal appearing at the second output terminal 26b is in the form of a train of impulses $Sd$ with a frequency which is representative of the angular speed of rotation of the output shaft of the engine, the impulses $Sc$ being shown in graph (d) of FIG. 4.

The signals $Va$, $Sb$ and $Sc$ thus produced are fed into a computing circuit 28 which is adapted to produce a digital output signal $Sg$ predominant over the spark-advance characteristics to be achieved in the individual engine cylinders in accordance with a predetermined schedule. Though not shown in the drawings, the computing circuit 28 comprises a saw-tooth wave generator which has an input terminal connected to the first output terminal 26a of the crank-angle detecting unit 24 and which is adapted to be triggered by the signal impulses $Sc$ from the first output terminal 26a of the detecting unit 24 for producing a train of ramp pulses $Se$ having a predetermined pulsewidth less than the intervals between the impulses $Sc$ and risetimes which are respectively concurrent with the impulses $Sc$ from the detecting unit 24, as indicated in graph (e) of FIG. 4. The computing circuit 28 further comprises a comparator (not shown) which has a first input terminal connected to the output terminal of the adding circuit 18 and a second input terminal connected to the output terminal of the above-mentioned saw-tooth wave generator. The comparator is operative to compare the output voltage $Va$ of the adding circuit 18 and the voltages of the ramp pulses $Se$ produced from the saw-tooth wave generator and produce square-shaped pulses $Sf$ when the voltage $Va$ is higher than the voltages of the ramp pulses $Se$, as indicated in graph (f) of FIG. 4. The comparator has an output terminal connected to one input terminal of a logic circuit (not shown) which has another input terminal of the impulse generator 22 and which is operative to pass therethrough the signal impulses $Sb$ from the impulse generator 22 in the presence of the square-shaped pulses $Sf$ delivered from the comparator. The logic circuit to achieve such a function may be composed of a logic "NAND" gate circuit having a first input terminal connected to the output terminal of the impulse generator 22 and a second input terminal connected to the output terminal of the above-mentioned comparator and a logic negation circuit having an input terminal connected to the output terminal of the "NAND" gate circuit so that a logic 1 is delivered as the signal impulse $Sg$ from the output terminal of the negation circuit in the presence of the signals $Sb$ and $Sf$ as logic 1 signals at both of the input terminals of the "NAND" gate circuit. The computing circuit 28 thus arranged has a first output terminal 30a to deliver the above-mentioned impulses passed through the logic circuit as indicated by $Sg$ in graph (g) of FIG. 4 and a second output terminal 30b through which an impulse $Sh$ is delivered responsive to termination of each of the square-shaped pulses $Sf$ produced by the comparator incorporated in the computing circuit 28, as indicated in graph (h) of FIG. 4.

The first and second output terminals 30a and 30b of the computing circuit 28 are connected to a memory circuit 32 which is adapted to be "latched" by the signal impulse $Sh$ delivered from the second output terminal 30b of the computing circuit and to register the impulses $Sg$ fed to the memory circuit 32 from the first output terminal 30a of the computing circuit 28 during each of the time intervals between the signal impulses $Sc$ from the first output terminal 26a of the detecting unit 24 or, in other words, the intervals between the timings at which the piston in each of the engine cylinders is moved into a predetermined position relative to the cylinder such as for example the top-dead-center position as previously mentioned. The time interval between such timings will be herein referred to as the cycle of operation of the circuit arrangement.

The memory circuit 32 has an output terminal connected to an input terminal of a preset counter 34 which has other input terminals connected to the first and second output terminals 26a and 26b, respectively, of the detecting unit 24. The preset counter 34 is adapted to be triggered at the beginning of each cycle of operation of the circuit arrangement by the signal impulse $Sc$ fed from the first output terminal 26a of the detecting unit 24 and is thus initiated into action to counter the signal impulses $Sd$ delivered from the second output terminal 26b of the detecting unit 24 after the preset counter 34 has been triggered and to add the impulses $Sd$ to the sum of the signal impulses $Sg$ which have been registered in the memory circuit 32 in the preceding cycle of operation. At an instant the preset counter 34 is thus, actuated, the potential in the preset counter 34 instantaneously rises to a value $Eo$ corresponding to the number $m$ of the impulses $Sg$ stored in the memory circuit 28 and is thereafter stepped up as the signal impulses $Sd$ from the second output 26b of the detecting unit 24 is impressed one after another on the preset counter 34 as indicated in graph (i) of FIG. 4. When the potential thus increased stepwise from the initial level of $Eo$ reaches a predetermined value $Ep$ with an $n$ number of signal impulses $Sd$ impressed on the preset counter 34, then the preset counter 34 produces a signal impulse Sj as indicated in graph (j) of FIG. 4. The signal impulse Sj will thus be delivered from the preset counter 34 at a time which is earlier than the terminating point of each cycle of operation by a period of time δ which is dictated by the number m of signal impulses Sg which have been registered in the memory circuit 28 during the preceding cycle of operation. The time interval δ thus determined by the preset counter 34 provides an amount of spark advance desired in each of the engine cylinders during one of the cycles of operation of the piston.

Figure 5:
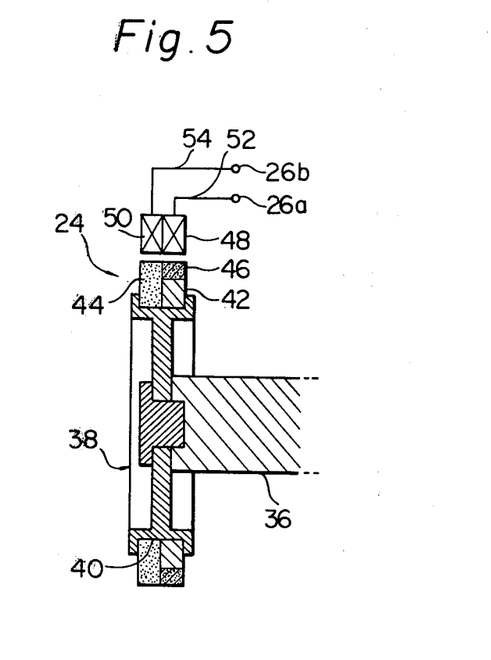
FIG. 5 is a sectional view which shows a preferred example of the detecting means forming part of the circuit arrangement illustrated in FIG. 1.

FIG. 5 illustrates a practical example of the detecting unit 24 incorporated into the circuit arrangement thus far described. The detecting unit 24 is arranged in association with the output shaft 36 of an internal combustion engine and comprises a circular disc member 38 rotatable with the output shaft 36. The disc member 38 is formed with a circumferential groove 40 and has closely received therein first and second circular rings 42 and 44 having substantially equal outside diameters. The first circular ring 42 is formed of a non-magnetic material and has embedded therein a predetermined number of permanent magnets 46 which are angularly regularly spaced apart from each other about the axis of rotation of the disc member 38. The number of the magnets 46 embedded in the first circular ring 42 is one half of the number of the engine cylinders associated with the engine output shaft 36 so that if the output shaft 36 is associated with four engine cylinders then two permanent magnets are positioned diametrically opposite to each other across the axis of the disc member 38 and, if the output shaft 36 is associated with six engine cylinders then three permanent magnets are provided and are spaced apart 120° from each other about the axis of rotation of the disc member 38. On the other hand, the second circular ring 44 is formed of ferrite and is alternately magnetized to north and south poles along its circumference. The number of the poles may be selected arbitrarily depending upon the desired spark-advance characteristics desirable from the signal impulses Sd and Sj shown in the graphs (d) and (j), respectively, of FIG. 4. By way of example, it is herein assumed that the north and south poles are formed in the circular ring 44 for every one degree of the circle so that a total of 360 poles are provided. In the vicinity of the first and second circular rings 42 and 44 thus arranged are positioned first and second magnetically inductive elements 48 and 50, respectively, which constitute electromagnetic pick-up means. An electromotive force is thus produced in the first inductive element 48 due to the interaction between the inductive element 48 and each of the permanent magnets 46 in the first circular ring 42 each time the disc member 38 is rotated about its axis through an angle equal to the arc of a circle subtended by adjacent two of the magnets 46. An electromotive force is likewise produced in the second inductive element 50 each time the disc member 38 is rotated through 1° about the axis thereof. The current thus produced from the first inductive element 48 is representative of the timing at which each of the pistons driving the output shaft 36 reaches a predetermined relative position to the associated cylinder. Such a relative position of the piston is herein assumed to be the top-dead-center (TDC) position as previously mentioned. On the other hand, the number of the currents, or impulses, produced in the second inductive element 50 is, when counted after the current has once been produced in the first inductive element 48, representative of the displacement of the piston past the top-dead-center position. The first and second inductive elements 48 and 50 are connected by lines 52 and 54 to the previously mentioned first and second output terminals 26a and 26b, respectively, of the detecting unit 24 so that the signal impulses Sc and Sd are delivered from the terminals 26a and 26b, respectively, as the output shaft 36 is driven for rotation by the pistons in the individual engine cylinders.

The operation of the spark-advance apparatus embodying the present invention will now be described with reference to FIGS. 1 to 5 of the drawings.

When the engine is operating, the engine speed sensor 10 detects the output speed of the engine and produces an output voltage Er proportional or otherwise related to the detected output speed of the engine. The voltage Er produced by the engine speed sensor 10 is fed to the first function generator 14 which converts it into a signal voltage Vr in accordance with the predetermined schedule indicated by the curve R shown in FIG. 2. When the engine is operative, especially, under idling or decelerating conditions, a partial vacuum is developed in the intake manifold of the engine so that the intake-manifold vacuum sensor 12 produces an output voltage Es which is proportional or otherwise related to the detected intake-manifold vacuum. The voltage Es produced by the vacuum sensor 12 is fed to the second function generator 16 which converts it into a signal voltage Vs in accordance with the predetermined schedule which is indicated by the curve S in FIG. 3. The signal voltages Vr and Vs thus produced by the first and second function generators 14 and 16, respectively, are passed into the voltage adding circuit 18, which produces an output voltage Va equal to the sum of the two input voltages Vr and Vs as indicated in the graph (a) of FIG. 4. On the other hand, the compensating signal generator 20 detects various operating and ambient conditions of the vehicle such as for example the temperature of the engine and the temperature and pressure of the ambient atmosphere and produces an output voltage Vb which varies with the detected parameters in accordance with a predetermined schedule. The signal voltage Vb thus produced by the compensating signal generator 20 is supplied to the impulse generator 22 including an oscillating circuit, producing a train of impulses Sb having a frequency which is dictated by the input voltage Vb as indicated in the graph (b) of FIG. 4. Simultaneously as the signal voltage Va is delivered from the voltage adding circuit 18 and the train of impulses Sb delivered from the impulse generator 22, the circular disc member 38 forming part of the detecting unit 24 shown in FIG. 5 is rotated with the output shaft 36 of the engine so that the first electromagnetic pick-up means 48 is operative to produce an impulse Sc each time the piston in each of the engine cylinders reaches its top-dead-center position in the cylinder as indicated by the graph (c) of FIG. 4 (or any other predetermined position relative to the cylinder if desired) whereas the second electromagnetic pick-up means 50 is operative to produce a train of impulses Sd representative of an angular velocity of rotation of the engine output shaft 36 as indicated by the graph (d) of FIG. 4. The signal impulse Sc thus appearing at the first output terminal 26a of the detecting unit 24 is fed to the input terminal of the saw-tooth wave generator (not shown) incorporated into the computing circuit 28. The saw-tooth wave generator is triggered to produce a ramp pulse S*e* each time the signal impulse S*c* is delivered from the first output terminal 26*a* of the detecting unit 24 as will be seen from the graphs (*c*) and (*e*) of FIG. 4. The voltage of the ramp pulses S*e* thus produced is compared with the signal voltage V*a* which is supplied from the adding circuit 18 so that a square-shaped pulse S*f* is produced with a pulsewidth corresponding to a duration in which the signal voltage V*a* from the adding circuit 18 is higher than the voltage of the ramp pulse S*e* as will be seen from the graphs (*e*) and (*f*) of FIG. 4. The square-shaped pulse S*f* is produced in this manner at an incipient stage of each of the time intervals between the signal impulses S*c* delivered from the first output terminal 26*a* of the detecting unit 24, or, in other words, between the timings at which the piston in each of the engine cylinders successively reaches its top-dead-center position. The square-shaped pulse S*f* is fed to the logic circuit also forming part of the computing circuit 28 though not shown so that the signal impulses S*b* delivered from the impulse generator 22 are passed to the first output terminal 30*a* of the computing circuit during a period of time corresponding to the time duration or pulsewidth of the square-shaped pulse S*f*, as indicated in the graph (*g*) of FIG. 4. The computing circuit 28 includes means (not shown) responsive to the fall-time of each of the square-shaped pulses S*f* for producing a signal impulse S*h* each time the square-shaped pulse S*f* terminates. The impulse S*h* is fed to the memory circuit 32 from the second output terminal 30*b* of the computing circuit 28 and "latches" the memory circuit 32, which thus memorizes the number *m* of the impulses S*g* delivered from the first output terminal 30*a* of the computing circuit 28. The signal impulse S*c* delivered from the first output terminal 26*a* of the detecting unit 24 is also fed to the preset counter 34. The preset counter 34 is consequently triggered and "read out" the number *m* of the impulses S*g* which have been registered in the memory circuit 32 during the preceding cycle of operation, viz., the time interval between the signal impulse S*c* triggering the preset counter 34 and the signal impulse preceding the former. Thus, the preset counter 34 produces therein a potential E*o* proportional to the number *m* of the impulses S*g* in the memory circuit 32 instantaneously when the same is triggered by the signal impulse S*c*. The preset counter 34 then starts to count the signal impulses S*d* which are successively fed from the second output terminal 26*b* of the detecting unit 24 to the preset counter 34 and to add the potential of each of the signal impulses S*d* to the potential E*o* initially built up in the preset counter 34. When the sum of the potential E*o* and the potentials of the signal impulses S*d* reaches the predetermined level E*p*, then the preset counter 34 produces an output signal S*j* shown in the graph (*j*) of FIG. 4. The output signal S*j* is thus delivered from the preset counter earlier, viz., responsive to the smaller number *n* of signal impulses S*d* than the larger number *m* of signal impulses S*g* stored in the memory circuit 32 as will be evident from the graph (*i*) of FIG. 4. The output signal S*j* of the preset counter 34 dictates the timing at which the spark is produced in each of the engine cylinders so that the time interval δ between the signal S*j* in the form of an impulse and the signal impulse S*c* to be fed to the preset counter 34 at the end of the cycle of operation of the preset counter provides an amount of spark-advance desirable in the particular cycle of operation. Because, in this instance, the number *n* of the signal impulses S*b* counted by the present counter 34 is proportional to the angular speed of rotation of the engine output shaft 36, the ignition timings are advanced more for the higher output speed of the engine.

The control signal S*j* may be fed back to the memory circuit 32 so that the memory circuit 32 is "unlatched" and accordingly the impulses S*g* which have been registered in one cycle of operation of the memory circuit are cleared to enable the memory circuit 32 to register the impulses S*g* in a subsequent cycle of operation.

The output terminal of the preset counter may be connected to a suitable drive unit which is adapted to be actuated by the control signal S*j* so as to produce a rotational output by which the breaker points or the control cam for the breaker points of the ignition distributor are actuated at an advanced timing if the distributor is of the contact-point type. If the distributor is of the magnetic pick-up type, the control signal delivered from the preset counter 34 may be supplied to a driver circuit for the timer core of the distributor or may be directly fed to the transistor control circuit of the timer core.

It will now be appreciated from the foregoing description that the spark-advance control apparatus according to the present invention is advantageous in that the control characteristics thereby achieved are less affected by the minor or causual transient operational fluctuations in the operating conditions, especially the angular speed of rotation of the output shaft, of the engine than in the prior art counterparts and are thus practically free from errors that would otherwise occur if such fluctuations are faithfully responded to. This is because of the fact that the angular speed of rotation of the output shaft of the engine is detected in a digital fashion and that the spark advance is controlled by a digital signal responsive only to substantial change in the operating conditions of the engine. The spark-advance control characteristics to be achieved by the apparatus according to the present invention may be readily changed by varying the circuit arrangements of, for example, the function generators and/or the compensating signal generator incorporated into the apparatus embodying the present invention.

Having described only one preferred embodiment of the spark-advance control apparatus according to the present invention, it should be borne in mind that such an embodiment is merely by way of example and is therefore subject to various changes and modifications where desired. Although, for example, the preset counter 34 incorporated in the circuit arrangement shown in FIG. 1 has been assumed to be arranged to provide the performance characteristics indicated in the graph (*i*) of FIG. 4, the same may be modified in such a manner as to build up a potential proportional or otherwise related to the reciprocal of the number *m* of the signal impulses S*g* stored in the memory circuit 32 and to deduce from such a potential a predetermined amount of potential each time the preset counter is supplied with the signal impulses S*d* from the detecting unit 24 so that the preset counter 34 produces the output signal S*j* when the potential developed therein is reduced to zero level.

What is claimed is:

1. An apparatus for controlling spark advance in an internal combustion engine having an output shaft and an intake manifold, the apparatus comprising, in combination:

analog signal generating means responsive to output speed of the engine and to vacuum in said engine intake manifold for producing an analog signal which varies with detected engine output speed with the detected intake manifold vacuum in accordance with respective predetermined schedules, digital signal generating means responsive to preselected operating parameters which affect performance characteristics of the engine for producing a first train of impulses with a frequency related to said parameters, detecting means responsive to rotational motion of the output shaft of the engine for producing a second train of impulses each representative of a timing at which a respective piston in each cylinder of said engine reaches a predetermined position relative to its associated engine cylinder and a third train of impulses having a frequency proportional to angular displacement of said output shaft, a computing circuit coupled to said detecting means to said digital signal generating means and to said analog signal generating means and responsive to each of the impulses of said second train of impulses from said detecting means for passing therethrough impulses of said first train of impulses from said digital signal generating means for a period of time which varies with the analog signal from said analog signal generating means in accordance with a predetermined schedule, a memory circuit for temporarily registering the impulses passed through said computing circuit from said digital signal generating means during each time interval between the impulses of said second train of impulses from said detecting means, and a preset counter circuit connected to said detecting means and to said memory circuit and responsive to signals therefrom for producing a spark-advance control signal at a timing which is advanced in proportion to that number of impulses registered in said memory circuit from said digital signal generating means in a time period immediately preceding each of said time intervals between the impulses of the second train of impulses from said detecting means and to the frequency of the impulses of the third train of impulses from said detecting circuit impressed on the counter circuit during each of said time intervals.

2. An apparatus as set forth in claim 1, in which said counter circuit produces a basic potential proportional to the number of the impulses registered in said memory circuit in the time period immediately preceding each of said time intervals and an additional potential stepwise increasing with the impulses of said third train of impulses successively impressed on the counter circuit from said detecting means during each of said time intervals and to compare the sum of the basic and additional potentials with a predetermined reference potential for producing said spark-advance control signal when said sum becomes equal to said reference potential.

3. An apparatus as set forth in claim 1, in which said counter circuit produces a basic potential proportional to the reciprocal of the number of the impulses registered in said memory circuit in the time period immediately preceding each of said time intervals and an additional potential stepwise increasing with the impulses of said third train of impulses successively impressed on said counter circuit from said detecting means during each of said time intervals and to subtract said additional potential from said basic potential for producing said spark-advance control signal when the difference between the basic potential and the additional potential becomes zero.

4. An apparatus as set forth in claim 1, in which said analog signal generating means comprises an engine speed sensor for detecting output speed of the engine and producing an output voltage related to the detected engine output speed, an intake-manifold vacuum sensor for detecting vacuum in the engine intake manifold and producing an output voltage related to the detected intake-manifold vacuum, a first function generator responsive to the output voltage from said engine speed sensor for producing a first signal voltage varying with said output voltage of the engine speed sensor in accordance with a predetermined schedule, a second function generator responsive to the output voltage from said intake-manifold vacuum sensor for producing a second signal voltage varying with the output voltage of the vacuum sensor in accordance with a predetermined schedule, and a voltage adding circuit for producing a signal voltage equal to the sum of the first and second signal voltages from said first and second function generators.

5. An apparatus as set forth in claim 1, in which said computing circuit comprises a saw-tooth wave generator responsive to each of said impulses of said second train of impulses from said detecting means for producing a ramp pulse having a duration shorter than each of said time intervals between said impulses of said second train of impulses from the detecting means and a risetime. concurrent with each of said impulses of said second train of impulses from the detecting means, a comparator for comparing said analog signal from said analog signal generating means with said ramp pulse for producing a square-shaped pulse when the former is higher than the latter, and circuit means for passing therethrough the impulses from said digital signal generating means to said counter circuit in the presence of the square-shaped pulse from said comparator.

6. An apparatus as set forth in claim 1, in which said digital signal generating means comprises a signal generator responsive to said preselected parameters for producing an output voltage which varies with the parameters in accordance with a predetermined schedule and an impulse generator operative to produce a train of impulses having a frequency related to the output voltage of said signal generator, said impulses produced from the impulse generator constituting said impulses of said first train of impulses from said digital generating means.

7. An apparatus as set forth in claim 6, in which said digital signal generating means comprises means sensitive to atmospheric temperature for producing an output voltage related to detected atmospheric temperature.

8. An apparatus as set forth in claim 6, in which said digital signal generating means comprises means sensitive to atmospheric pressure for producing an output voltage related to detected atmospheric pressure.

9. An apparatus as set forth in claim 6, in which said digital signal generating means comprises means sensitive to temperature of the engine for producing an output voltage related to the detected engine temperature.

10. An apparatus as set forth in claim 1, in which said predetermined position of said piston relative to the associated engine cylinder corresponds to the top-dead-center position of the piston.

11. An apparatus as set forth in claim 1, in which said detecting means comprises a circular disc member rotatable with the engine output shaft, a first circular ring mounted on the circumference of said disc member and having embedded therein a plurality of permanent magnets equiangularly spaced apart from each other about an axis of rotation of the disc member, the number of said permanent magnets being one half of the number of the engine cylinders associated with said output shaft, a second cylinder ring mounted on the circumference of the disc member and having a multiplicity of south and north pole sections which are disposed alternately to each other along the entire circumference of the ring, first electromagnetic pick-up means associated with said first circular ring for producing an output current when each of the permanent magnets on the disc member is magnetically linked with the pick-up means as the disc member is driven for rotation by the engine output shaft, said output current providing the impulses of said second train of pulses delivered from said detecting means, and second electromagnetic pick-up means associated with said second circular ring for producing an output current when each of the pole sections having like polarity is magnetically linked with the second electromagnetic pick-up means as the disc member is driven to rotate by the engine output shaft, said output current from said second electromagnetic pick-up means providing the impulses of said third train of pulses delivered from said detecting means.

* * * * *